United States Patent [19]

Ikeda et al.

[11] Patent Number: 5,371,718
[45] Date of Patent: Dec. 6, 1994

[54] DOPPLER-EFFECT VEHICLE GROUND SPEED DETECTING APPARATUS HAVING MEANS FOR SENSING ABNORMALITY OF DETECTED GROUND SPEED

[75] Inventors: Shinji Ikeda, Susono; Hiroshi Naganawa, Kakamigahara, both of Japan

[73] Assignees: Toyota Jidosha Kabushiki Kaisha; Nippondenso Co., Ltd., both of Aichi, Japan

[21] Appl. No.: 38,221

[22] Filed: Mar. 29, 1993

[30] Foreign Application Priority Data

Apr. 13, 1992 [JP] Japan ................. 4-120059

[51] Int. Cl.⁵ ............... G01S 15/60; G01S 13/60
[52] U.S. Cl. ...................... 367/91; 342/70; 342/104
[58] Field of Search ............ 367/89, 90, 91; 342/104, 117, 70

[56] References Cited

U.S. PATENT DOCUMENTS

| | | | |
|---|---|---|---|
| 4,346,774 | 8/1982 | Hirota et al. | 367/91 |
| 4,366,546 | 12/1982 | Tachibana et al. | 364/426.02 |
| 4,893,287 | 1/1990 | Stratton et al. | 367/91 |
| 4,942,558 | 7/1990 | Hiniker et al. | 367/91 |
| 4,969,100 | 11/1990 | Takata et al. | 364/426.02 |
| 5,016,017 | 5/1991 | Kodera et al. | 342/106 |

FOREIGN PATENT DOCUMENTS

| | | |
|---|---|---|
| 0188906 | 7/1986 | European Pat. Off. |
| 55-116285 | 9/1980 | Japan . |
| 63-46961 | 2/1988 | Japan . |

*Primary Examiner*—Ian J. Lobo
*Attorney, Agent, or Firm*—Oliff & Berridge

[57] ABSTRACT

A Doppler-effect speed detecting apparatus for detecting a ground speed of a vehicle, including a transmitter for transmitting a wave towards the ground surface, a receiver for receiving the wave reflected by the ground surface, and an output device for producing an output indicative of the ground speed according to the frequencies of the transmitted and reflected waves. The apparatus further includes a device for determining presence or absence of abnormality relating to the output of the output device, on the basis of an output level of the receiver as well as a speed difference between the ground speed obtained by the output device and an estimated vehicle speed which is obtained on the basis of rotating speeds of the vehicle wheels.

14 Claims, 5 Drawing Sheets

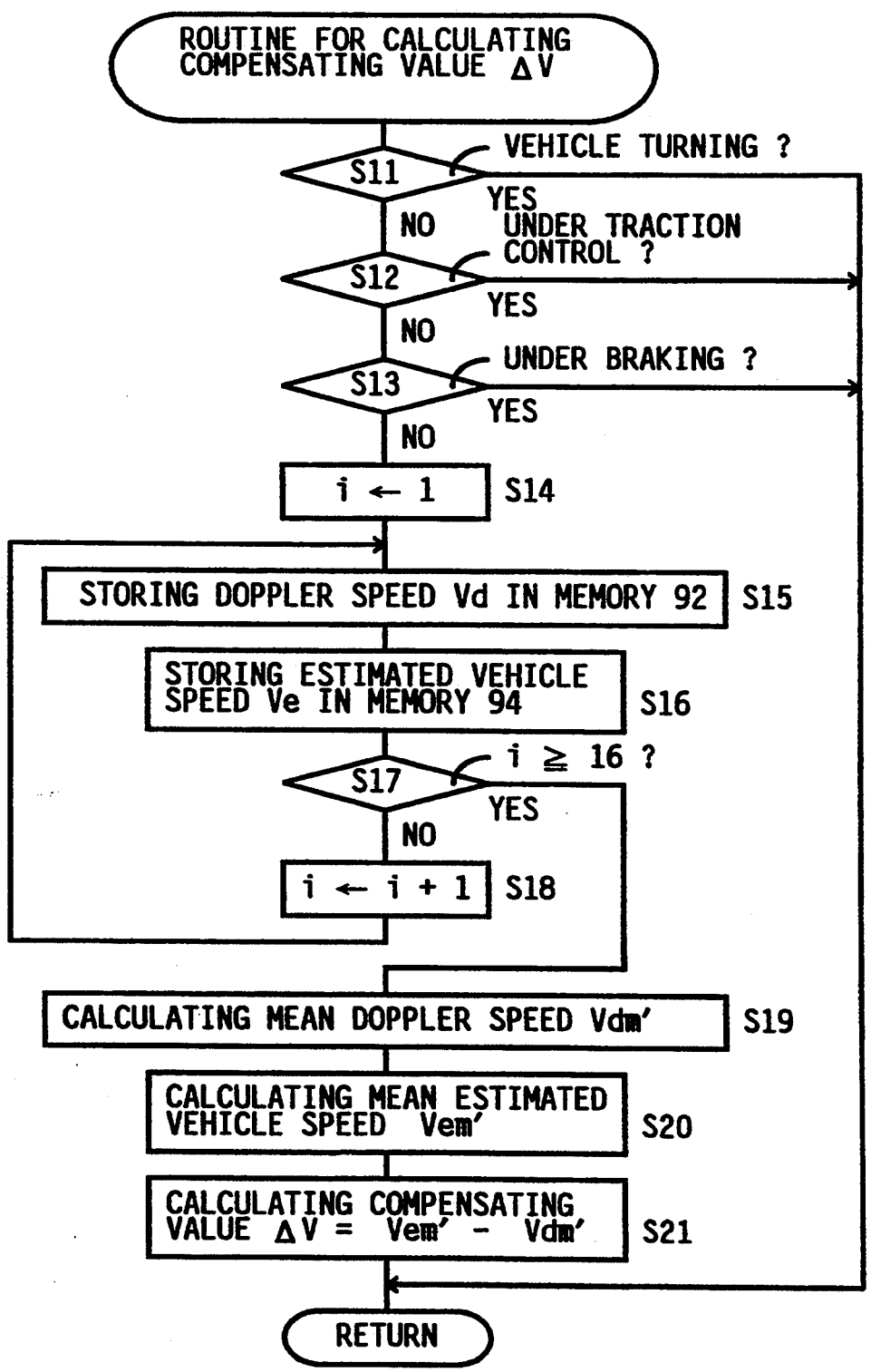

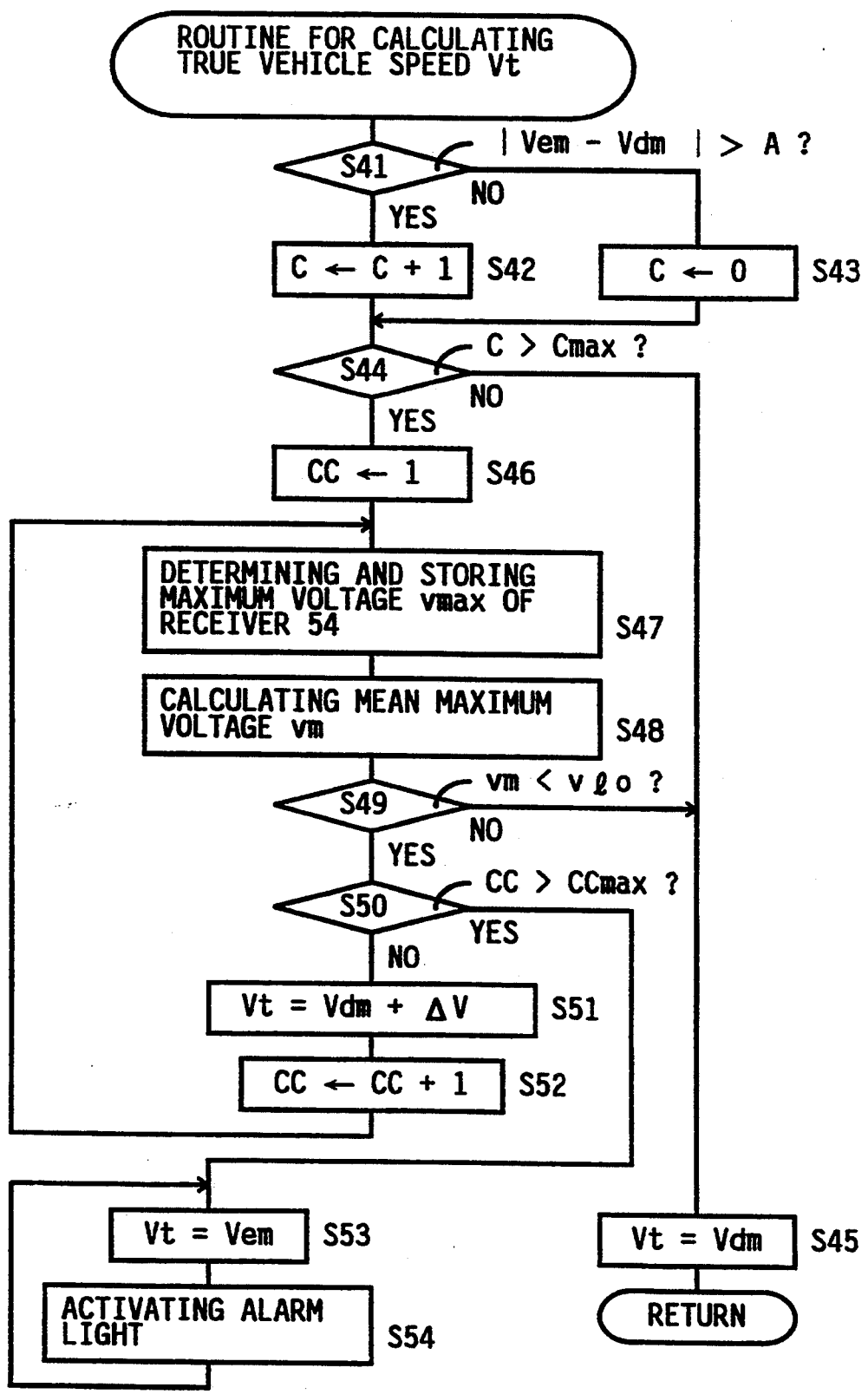

DOPPLER-EFFECT VEHICLE GROUND SPEED DETECTING APPARATUS HAVING MEANS FOR SENSING ABNORMALITY OF DETECTED GROUND SPEED

BACKGROUND OF THE INVENTION

Field of the Invention

The present invention relates generally to a Doppler-effect speed sensing apparatus for detecting and determining the ground speed of a motor vehicle with respect to the ground or road surface, by utilizing the Doppler effect or Doppler shift, and more particularly to a technique for improving the accuracy of determination of abnormality or erroneous nature of the detected ground speed.

In the field of controlling an automotive vehicle, there has been a high need for precisely detecting the ground speed of the vehicle relative to the ground surface. An example of a known Doppler radar speed detecting apparatus which satisfies the above need includes (a) a transmitter which generates and transmits a wave towards the ground surface, (b) a receiver which receives a portion of the wave reflected by the ground surface, and (c) output means for producing an output indicative of the vehicle ground speed, on the basis of the frequency of the wave as transmitted from the transmitter (hereinafter referred to as "transmitting frequency" and the frequency of the wave as received by the receiver (hereinafter referred to as "receiving frequency"), and according to the principle of the well known "Doppler effect" or "Doppler shift". Namely, such a Doppler radar speed sensor produces an output based on a shift of the receiving frequency relative to the transmitting frequency.

Generally, a Doppler-effect vehicle ground speed sensor permits higher accuracy of detection of the vehicle running speed, than a conventional speed estimating device which is adapted to estimate the vehicle running speed from the speeds of the vehicle wheels. On the other hand, the Doppler speed sensor is subject to an influence by some operating conditions, to which the speed estimating device is immune. For example, the speed detecting accuracy of the Doppler speed sensor is adversely affected by the condition of the road or ground surface from which the transmitted wave is reflected. Further, a member through which the wave from the transmitter is transmitted towards the ground surface, and a member through which the wave reflected by the ground surface is received by the receiver are likely to be stained or soiled by foreign matters, whereby the magnitude of the output signal of the receiver tends to be undesirably lowered.

In the light of the above drawback, it has already been proposed to provide means for monitoring the accuracy of detection or measurement of the vehicle ground speed by such a Doppler-effect ground speed detecting apparatus, that is, means for determining whether the output of the apparatus is sufficiently accurate, or abnormal or erroneous with an excessive error introduced therein. According to the proposed Doppler-effect detecting apparatus, the estimated vehicle speed obtained by the speed estimating device is used as the ground speed, with or without some modification or compensation if the sensor output is found erroneous. This proposed approach is effective to minimize the reduction in the detecting accuracy of the Doppler-effect detecting apparatus. An example of the proposed detecting apparatus is disclosed in JP-A-63-46961 (published in 1988), wherein abnormality detecting means is provided, in addition to the transmitter, receiver and output means as described above. Described more specifically, the abnormality detecting means is adapted to determine if a difference between the ground speed as detected by the detecting apparatus and the estimated vehicle speed as estimated by the speed estimating device is larger than a predetermined threshold for more than a predetermined length of time. If so, the abnormality detecting means determines that there exists some abnormal condition in the detecting apparatus. The abnormality detecting means finds no abnormality if the above difference is not larger than the threshold for more than the predetermined period.

The abnormality detecting means of the above proposed Doppler-effect ground speed detecting apparatus operates on an assumption that since the accuracy of the estimated vehicle speed is generally high, the vehicle ground speed is substantially equal to the estimated vehicle speed as long as the Doppler-effect ground speed detecting apparatus is normal or intact. Actually, however, the accuracy of the estimated vehicle ground speed based on the wheel speeds is not sufficiently stable. For instance, where the brake pressures for all of the four wheels of a 4-wheel drive vehicle are regulated in an anti-lock fashion, the braking torques applied to each pair of wheels connected through a differential gear device interfere with each other, whereby the vehicle ground speed cannot be accurately estimated on the basis of the wheel speeds. Similarly, the accuracy of estimation of the vehicle ground speed tends to be lowered when any one of the tires is changed to a spare tire which has a smaller diameter than the other tires. For the above reasons, the conventional abnormality detecting device which relies solely on the difference between the estimated vehicle speed and the detected vehicle ground speed is not capable of finding or detecting abnormality or erroneous nature of the detected vehicle ground speed with sufficiently high accuracy.

SUMMARY OF THE INVENTION

It is therefore a first object of this invention to provide an improved Doppler-effect vehicle ground speed detecting apparatus which is capable of detecting abnormality of the detected vehicle ground speed, with higher accuracy.

The above object may be achieved according to the principle of this invention, which provides a Doppler-effect speed detecting apparatus for detecting a ground speed of a motor vehicle, comprising: (a) vehicle speed estimating means for obtaining an estimated vehicle speed on the basis of rotating speeds of wheels of the vehicle; (b) a transmitter for transmitting a wave towards a ground surface; (c) a receiver for receiving a portion of the transmitted wave which is reflected by the ground surface; (d) output means for producing an output indicative of the ground speed of the vehicle, according to a Doppler effect on the basis of a frequency of the transmitted wave and a frequency of the reflected wave; and (e) abnormality judging means for determining presence and absence of abnormality relating to the output of the output means, on the basis of an output level of the receiver as well as a speed difference between the ground speed obtained by the output means and the estimated vehicle speed obtained by the vehicle speed estimating means.

The Doppler-effect vehicle ground speed detecting apparatus of the present invention constructed as described above is based on a recognition that when any abnormality of the output of the output means exists, there is a tendency of increase not only in the speed difference between the vehicle ground speed as represented by the output of the output means and the estimated vehicle speed, but also in the amount of deviation of the output level of the receiver from the nominal level or range. While the output level of the receiver generally tends to be lowered from the nominal level in the presence of any abnormality relating to the output of the output means, it may rise above the nominal level. The output level of the receiver relates to the magnitude of the energy of the reflected wave received by the receiver. Accordingly, the present apparatus which relies upon the output level of the receiver as well as the speed difference assures higher accuracy of determination as to the presence of abnormality relating to the output of the output means, than the known counterpart apparatus which relies upon only the speed difference.

The output of the abnormality judging means may be utilized to warn the vehicle operator of the presence of the abnormality detected, and to trigger an operation to determine the true vehicle ground speed in a special manner.

A second object of the invention to provide an improved Doppler-effect vehicle ground speed detecting apparatus which assures accurate determination of the actual ground speed of the motor vehicle.

The above second object may be achieved according to a second aspect of this invention, which provides a Doppler-effect speed detecting apparatus for determining a ground speed of a motor vehicle, comprising: (a) vehicle speed estimating means for obtaining an estimated vehicle speed on the basis of rotating speeds of wheels of the vehicle; (b) a transmitter for transmitting a wave towards a ground surface; (c) a receiver for receiving a portion of the transmitted wave which is reflected by the ground surface; (d) output means for producing an output indicative of the ground speed of the vehicle, according to a Doppler effect on the basis of a frequency of the transmitted wave and a frequency of the reflected wave, and (e) abnormality judging means for determining presence and absence of abnormality relating to the output of the output means; and (f) vehicle speed determining means for determining a provisional vehicle speed on the basis of the output of the output means, and obtaining a correlation between the provisional vehicle speed and the estimated vehicle speed when the vehicle is running under a condition in which an actual ground speed of the vehicle should substantially coincide with the estimated vehicle speed, the vehicle speed determining means determining the provisional vehicle speed as a true vehicle speed during a first time period during which the abnormality judging means determines the absence of any abnormality relating to the output of the output means, the vehicle speed determining means operating, during a second time period during which the abnormality judging means determines the presence of any abnormality relating to the output of the output means, to obtain the true vehicle speed by adjusting the provisional vehicle speed according to the correlation obtained under the condition during a third time period which precedes the second time period.

A third object of the invention to provide a motor vehicle equipped with such an improved Doppler-effect vehicle ground speed detecting apparatus.

The above third object may be achieved according to a third aspect of this invention, which provides a motor vehicle having a Doppler-effect speed detecting apparatus for detecting a ground speed of the vehicle, the speed detecting apparatus comprising: (a) vehicle speed estimating means for obtaining an estimated vehicle speed on the basis of rotating speeds of wheels of the vehicle; (b) a transmitter for transmitting a wave towards a ground surface; (c) a receiver for receiving a portion of the transmitted wave which is reflected by the ground surface, (d) output means for producing an output indicative of the ground speed of the vehicle, according to a Doppler effect on the basis of a frequency of the transmitted wave and a frequency of the reflected wave; and (e) abnormality judging means for determining presence and absence of abnormality relating to the output of the output means, on the basis of an output level of the receiver as well as a speed difference between the ground speed obtained by the output means and the estimated vehicle speed obtained by the vehicle speed estimating means.

BRIEF DESCRIPTION OF THE DRAWINGS

The above and optional objects, features and advantages of the present invention will be better understood from the following detailed description of presently preferred embodiments of the invention, when considered in conjunction with the accompanying drawings, wherein:

FIG. 4 is a flow chart illustrating a program also stored in the read-only memory, for executing a routine for calculating a compensating value used to obtain a true ground speed of the vehicle;

FIG. 5 is a flow chart illustrating a program also stored in the read-only memory, for executing a routine for calculating the true ground speed of the vehicle.

DETAILED DESCRIPTION OF THE PREFERRED EMBODIMENTS

Figure 1:
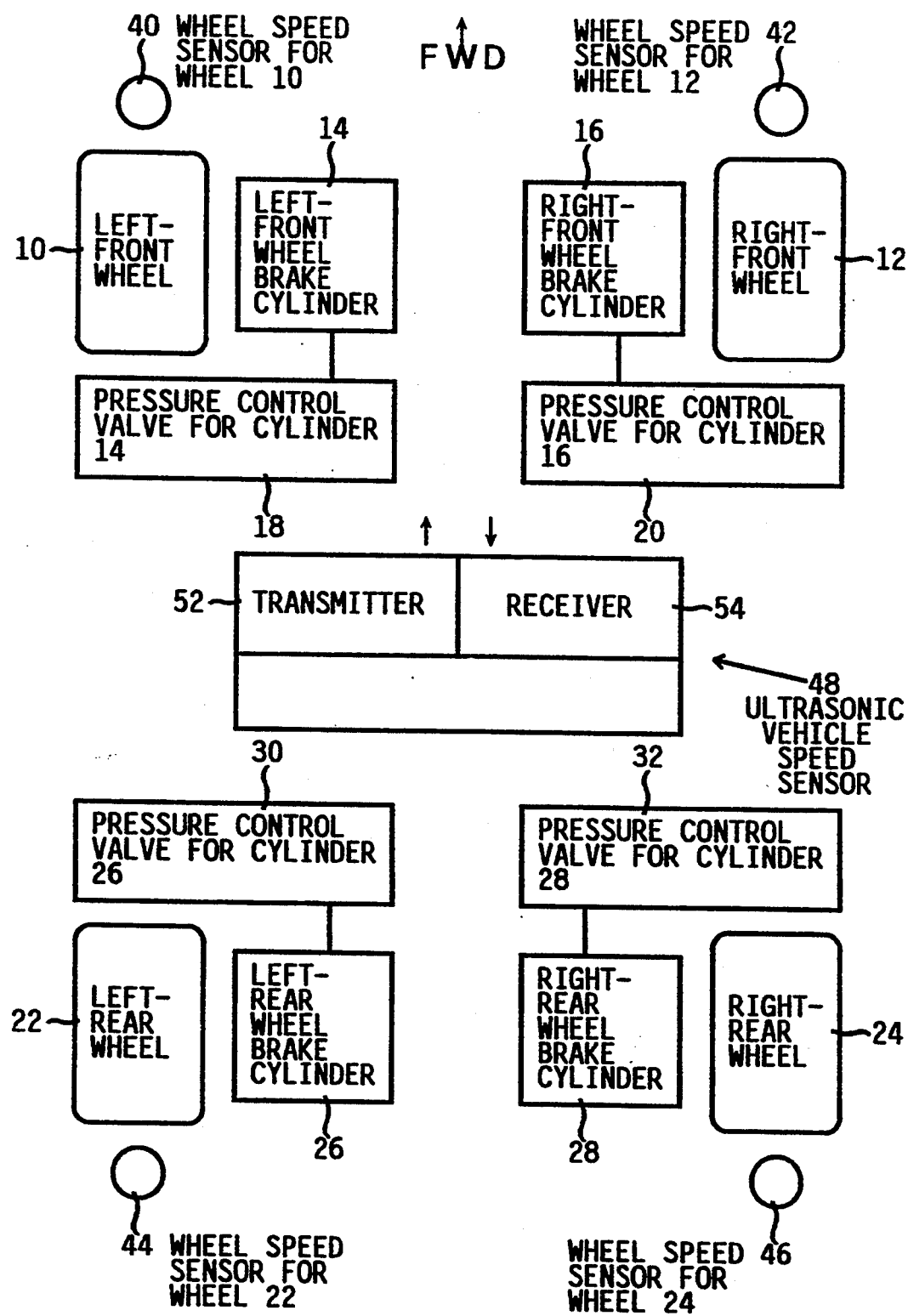
FIG. 1 is a schematic view showing an anti-lock and traction control brake system for a motor vehicle, which includes a Doppler-effect vehicle ground speed detecting apparatus constructed according to one embodiment of the present invention.

Referring first to FIG. 1, the hydraulic brake system for a 4-wheel automotive vehicle includes two front-wheel brake cylinders 14, 16 for left and right front wheels 10, 12, and two rear-wheel brake cylinders 26, 28 for left and right rear wheels 22, 24. The rear wheels 22, 24 are drive wheels driven by an engine, while the front wheels 14, 16 are idler wheels. The brake system is capable of controlling the hydraulic braking pressures in the brake cylinders 14, 16, 26, 28 in an anti-lock or anti-skid fashion, and also controlling the traction forces of the drive rear wheels 22, 24 upon starting or acceleration of the vehicle so as to prevent slipping of the rear wheels.

The braking pressures in the front-wheel brake cylinders 14, 16 are regulated by respective pressure control valves 18, 20, while those in the rear-wheel brake cylinders 26, 28 are regulated by respective pressure control valves 30, 32, as shown in FIG. 1. The rotating speeds of the wheels 10, 12, 22, 24 are detected by respective four wheel speed sensors 40, 42, 44 and 46, which are disposed adjacent to the wheels 10, 12, 22, 24. The wheel speed sensors 40, 42, 44, 46 are adapted to detect the rotating speeds of rotors rotating with the wheels, and generate signals representative of the speeds of the wheels 10, 12, 22, 24.

The brake system is equipped with one embodiment of a Doppler-effect vehicle ground speed detecting apparatus of this invention, which has an ultrasonic vehicle speed sensor 48 adapted to detect or determine the ground speed of the vehicle by utilizing a Doppler effect of a wave in the form of an ultrasonic wave. The ultrasonic vehicle speed sensor 48 includes a transmitter 52 for generating and transmitting the ultrasonic wave, and a receiver for receiving a portion of the transmitted ultrasonic wave which has been reflected from the ground or road surface over which the vehicle is passing. The transmitter 52 and the receiver 54 are attached to the underside of the vehicle body such that the boresights of the transmitter and receiver 52, 54 or the paths of propagation of the ultrasonic wave therefrom or thereto are inclined or angularly oriented in a forward direction of the vehicle, at a predetermined angle relative to the ground surface. The ultrasonic wave transmitted from the transmitter 52 is reflected by the ground surface, and a portion of the reflected wave which propagates along the boresight of the receiver 54 is received by the receiver 54.

Figure 2:
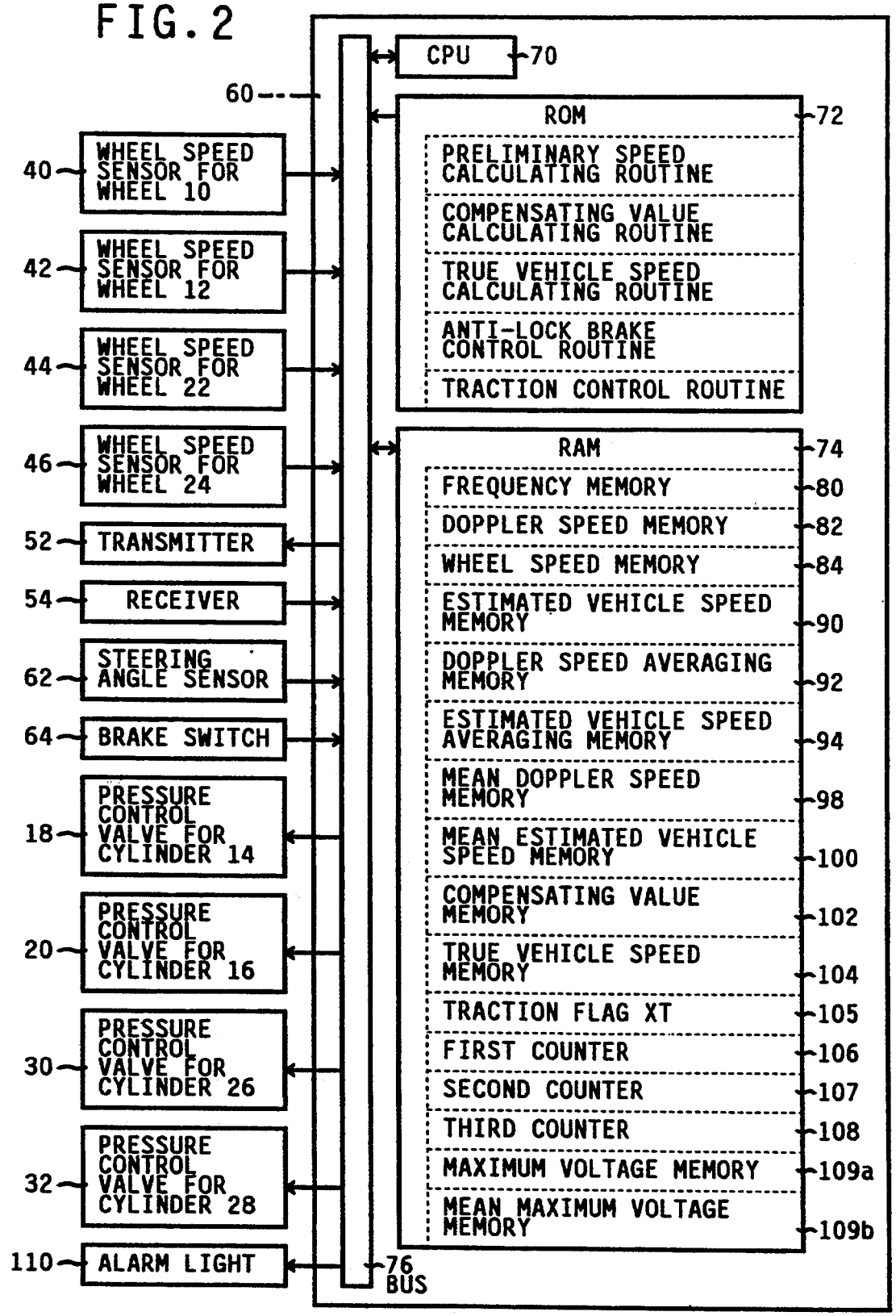
FIG. 2 is a block diagram showing a control system for the brake system of FIG. 1, which includes a controller having a read-only memory and a random-access memory.

Referring next to FIG. 2, the brake system uses a controller 60 to which are connected the wheel speed sensors 40, 42, 44, 46, the pressure control valves 18, 20, 30, 32, and the transmitter and receiver 52, 54 of the ultrasonic vehicle speed sensor 48. The controller is adapted to receive output signals of a steering angle sensor 62 and a BRAKE switch 64. The steering angle sensor 62 senses a steering angle of the steering wheel of the vehicle, while the BRAKE switch 64 senses an operation of a brake pedal which is depressed by the vehicle operator to activate the wheels brakes 14, 16, 26, 28. The controller 60 controls an alarm light 110 which will be described. The controller 60 is constituted principally by a computer which incorporates a central processing unit (CPU) 70, a read-only memory (ROM) 72, a random-access memory (RAM) 74, and a bus interconnecting these elements 70, 72, 74. The wheel speed sensors 40, 42, 44, 46 and the other elements indicated above are connected to the bus 76 via suitable control circuits.

The ROM 72 stores various control programs which include: a program for executing a routine for calculating values Vd, Vdm, Ve and Vem (which will be described), as illustrated in the flow chart of FIG. 3; a program for executing a routine for calculating a compensating value $\Delta V$ (which will be described), as illustrated in the flow chart of FIG. 4; a program for executing a routine for calculating a true vehicle speed Vt (which will be described), as illustrated in the flow chart of FIG. 5; a program for executing an anti-lock brake pressure control routine for controlling the pressure control valves 18, 20, 30, 32, in an anti-lock fashion, so as to prevent excessive amounts of slip of the wheels 10, 12, 22, 24 upon brake application; and a program for executing a traction control routine for controlling the pressure control valves 30, 32, so as to prevent excessive amounts of slip of the drive wheels (rear wheels) 22, 24. The anti-lock brake pressure control routine and the traction control routine both use the vehicle ground speed Vt determined by the routine of FIG. 5, for controlling the pressure control valves 18, 20, 30, 32.

The RAM 74 has various memories such as a FREQUENCY memory 80, a DOPPLER SPEED memory 82, a WHEEL SPEED memory 84, an ESTIMATED VEHICLE SPEED memory 90, a DOPPLER SPEED AVERAGING memory 92, an ESTIMATED VEHICLE SPEED AVERAGING memory 94, a MEAN DOPPLER SPEED memory 98, a MEAN ESTIMATED VEHICLE SPEED memory 100, a COMPENSATING VALUE memory 102, a TRUE VEHICLE SPEED memory 104, a MAXIMUM VOLTAGE memory 109a and a MEAN MAXIMUM VOLTAGE memory 109b. The RAM 74 also has a TRACTION flag XT indicated at 105, a first counter 106, a second counter 107 and a third counter 108. The functions of the memories indicated above will become apparent from the following description. The TRACTION flag XT when set at "1" means that the controller 60 is in a TRACTION control mode in which the traction control routine indicated above is executed. The counters 106–108 will be described in connection with the routines of FIGS. 4 and 5.

Figure 6:
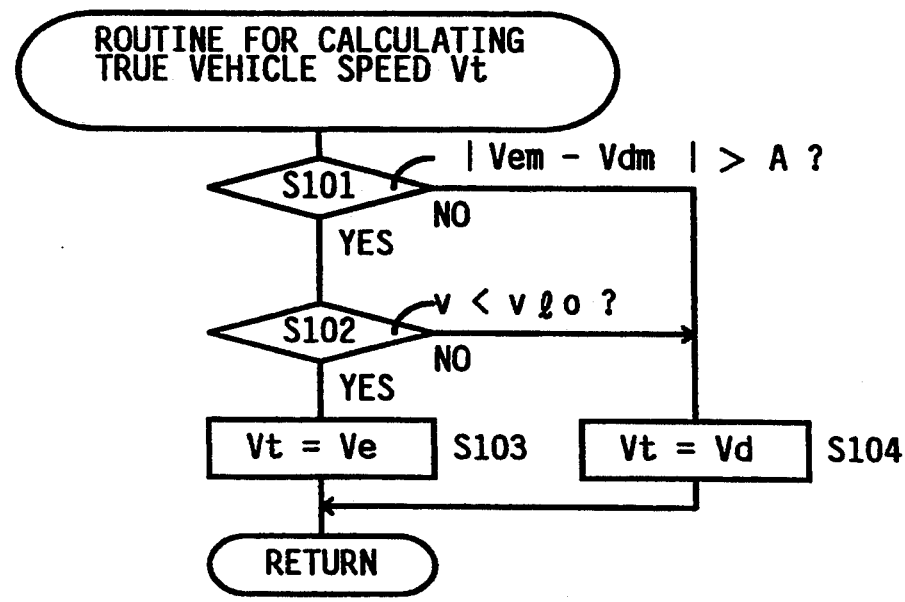
FIG. 6 is a flow chart illustrating a program for a routine corresponding to that of FIG. 5, which is used in another embodiment of this invention.

In the brake system constructed as described above, the ultrasonic vehicle speed sensor 48 is activated upon application of power to the controller 60, whereby the ultrasonic wave having a frequency ft (transmitting frequency) is transmitted toward the ground surface. Further, the CPU 70 repeatedly executes the routines of FIGS. 4–6, and the anti-lock brake control routine and the traction control routine as needed.

Referring to the flow chart of FIG. 3, there will be described the routine for calculating the values Vd, Vdm, Ve and Vem which are used in the routines of FIGS. 4 and 5.

Figure 3:
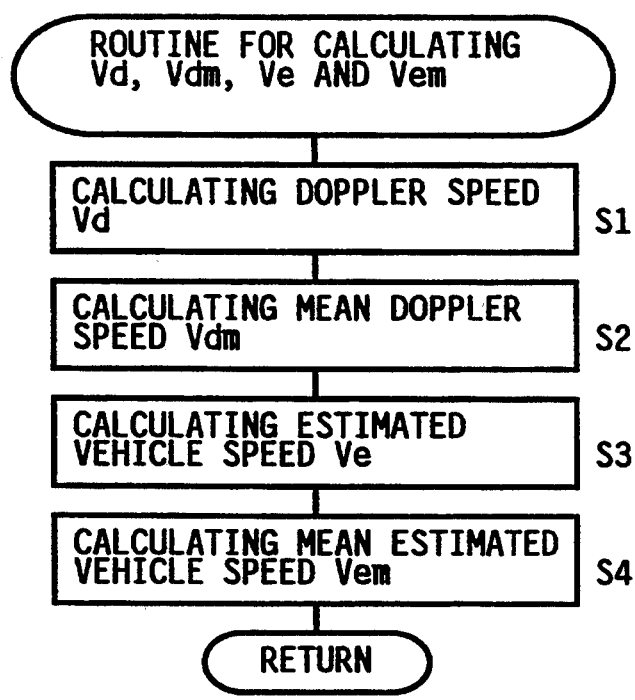
FIG. 3 is a flow chart illustrating a program stored in the read-only memory of FIG. 2, for executing a routine for calculating various speed values of the vehicle.

The routine of FIG. 3 is started with step S1 to determine a frequency fr (receiving frequency fr) of the ultrasonic wave as received by the receiver 54, on the basis of the output of the receiver 54. The determined receiving frequency fr is stored in the FREQUENCY memory 80 of the RAM 74. Then, a Doppler speed Vd is calculated on the basis of the receiving and transmitting frequencies fr, ft, and according to the following equation:

$$Vd = a \cdot (fr - ft)/\{(ft + fr) \cdot \cos\Phi\}$$

where
 a = propagation speed of the ultrasonic wave
 $\Phi$ = angle of the transmitter 54 and receiver 56 relative to the vehicle body (ground surface)

The thus calculated Doppler speed Vd is stored in the DOPPLER SPEED memory 82 of the RAM 74. This memory 82 is adapted to store a predetermined number of the successive Doppler speed values Vd as counted from the last calculated value. Step S1 is followed by step S2 to calculate a mean Doppler speed Vdm, which is an average of the predetermined number of the last calculated speed values Vd stored in the DOPPLER SPEED memory 82. The calculated mean Doppler speed Vdm is stored in the MEAN DOPPLER SPEED memory 98.

The control flow then goes to step S3 to calculate the rotating speeds of the wheels 10, 12, 22, 24, on the basis of the output signals from the wheel speed sensors 40, 42, 44, 46. The calculated wheel speeds are stored in the WHEEL SPEED memory 84 of the RAM 74. Further, an estimated vehicle speed Ve is calculated from the calculated wheel speeds. Described in detail, the highest one of the speeds of the four wheels 10, 12, 22, 24 is determined as the estimated vehicle speed, while brake is applied to the vehicle with the BRAKE switch 64 turned on. After the deceleration value of the wheel having the highest wheel speed has exceeded a predetermined upper limit, the estimated vehicle speed is fixed at the highest wheel speed at that time. When the vehicle is accelerating or coasting without brake application, the average of the speeds of the two drive wheels (rear wheels) 10, 12 is determined as the estimated vehicle speed.

The estimated vehicle speed Ve thus calculated is stored in the ESTIMATED VEHICLE SPEED memory 90 of the RAM 74. This memory is also adapted to store a predetermined number of the successive estimated vehicle speed values Ve as counted from the last calculated value. Step S3 is followed by step S4 to calculate a mean estimated vehicle speed Vem, on the basis of the predetermined number of the successive estimated vehicle speed values Ve stored in the memory 90. The calculated mean estimated vehicle speed Vem is stored in the MEAN ESTIMATED VEHICLE SPEED memory 100. One cycle of execution of the routine of FIG. 4 is terminated upon completion of step S4.

Reference is now made to the flow chart of FIG. 4, which shows the routine for calculating the compensating value $\Delta V$ used in the routine of FIG. 5. As explained below, the compensating value $\Delta V$ obtained in step S21 of the routine corresponds to a difference between the mean estimated vehicle speed Vem and the mean Doppler speed Vdm while the vehicle is running substantially straight with substantially no slip of the wheels. In this running condition, the mean estimated vehicle speed Vem is considered to be almost equal to the actual ground speed, and the difference between the mean estimated vehicle speed Vem and the mean Doppler speed Vdm is likely to represent a detecting error of the ground speed obtained on the basis of the output of the ultrasonic vehicle speed sensor 48. In other words, the detecting error is not reliable if it is obtained from the mean speeds Vem and Vdm while the vehicle is turning or cornering and/or the wheels are slipping on the road or ground surface.

In the light of the above fact, the compensating value $\Delta V$ used for compensating the mean Doppler speed Vdm for the detecting error is obtained while the vehicle is not turning and while the vehicle is neither in the traction control mode nor under brake application. As is apparent from the description of the routine of FIG. 5, the mean Doppler speed Vdm obtained in step S2 is compensated for the detecting error, by using the compensating value $\Delta V$, if the extent of the detecting error is found excessively large.

The routine of FIG. 4 is initiated with step S11 to determine whether the vehicle is turning or not. Described more specifically, step S11 is implemented to determine whether the steering angle represented by the output signal from the steering angle sensor 62 is larger than a predetermined threshold or not. If the vehicle is turning with the steering angle larger than the threshold, an affirmative decision (YES) is obtained in step S11, and one cycle of execution of the routine of FIG. 4 is terminated. If the vehicle is not turning, a negative decision (NO) is obtained, and the control flow goes to step S12 to determine whether the controller 60 is in the traction control mode or not. This determination is made based on the state of the TRACTION flag XT set in the RAM 74. If the controller 60 is in the traction control mode, the rear drive wheels 22, 24 may possibly be slipping. In this case, an affirmative decision (YES) is obtained in step S12, and one cycle of execution of the routine is terminated. If the controller 60 is not in the traction control mode, a negative decision (NO) is obtained, and step S12 is followed by step S13 to determine whether brake is currently applied to the vehicle or not, namely, whether the BRAKE switch 64 is on or off. If the BRAKE switch 64 is on, one cycle of execution of the routine is terminated. If the BRAKE switch 64 is off, this means that the vehicle is running without brake application thereto, and the control flow goes to step S14 to set the count "i" of a first counter 106 to an initial value "1".

Then, the control flow goes to step S15 to read out the last Doppler speed value Vd from the DOPPLER SPEED memory 82, and store it in the DOPPLER SPEED AVERAGING memory 92. This memory 92 is adapted to store the last 16 Doppler speed values Vd. The counter 106 is provided to count the number of these values Vd. Step S15 is followed by step S16 to read out the last estimated vehicle speed Ve from the ESTIMATED VEHICLE SPEED memory 90, and store it in the ESTIMATED VEHICLE SPEED AVERAGING memory 94. This memory 94 is also adapted to store the last 16 estimated vehicle speed values Ve.

The control flow then goes to step S17 to determine whether the count "i" of the first counter 106 is equal to or larger than "16" or not. That is, step S17 is provided to determine whether the memories 92 and 94 have stored respectively the last 16 Doppler speed values Vd and the last 16 estimated vehicle speed values Ve while the vehicle is running straight with substantially no slip of the wheels 10, 12, 22, 24. If the count "i" is smaller than "16", then step S18 is implemented to increment the count "i", and the control returns to step S15.

When an affirmative decision (YES) is obtained in step S17 as a result of repetition of steps S15–S18, the control flow goes to step S19 to calculate a mean Doppler speed value Vdm' on the basis of the last 16 Doppler speed values Vd. Step S19 is followed by step S20 in which a mean estimated vehicle speed value Vem' is calculated on the basis of the last 16 estimated vehicle values Ve. It is noted that the values Vdm' and Ve' are different from the values Vdm and Vem obtained in steps S3 and S4 of the routine of FIG. 3. Then, step S21 is implemented to calculate the compensating value $\Delta V$ by subtracting the mean Doppler speed value Vdm' from the mean estimated vehicle speed value Vem'. The calculated compensating value $\Delta V$ is stored in the COMPENSATING VALUE memory 102 of the RAM 74. Thus, one cycle of execution of the routine of FIG. 4 is completed.

Before describing the routine of FIG. 5 in detail, the routine will be briefly explained.

The routine of FIG. 5 is designed to first determine whether the difference between the currently calculated mean estimated vehicle speed Vem and means Doppler speed Vdm is larger than a predetermined threshold value "A" for more than a predetermined length of time, or not, and then determine whether the output level of the receiver 54 in the form of a voltage level v is lower than a predetermined threshold value vlo or not. If these two determinations are affirmative, it is judged that the vehicle ground speed as detected by the ultrasonic vehicle speed sensor 48 is abnormal or erroneous. In this case, a sum of the current mean Doppler speed Vdm and the current compensating value Δv is determined as a true vehicle speed Vt (compensated vehicle ground speed), for a predetermined length of time after the output voltage v has dropped below the threshold value vlo. If the abnormal state of the detected vehicle ground speed lasts for a long time exceeding the above predetermined length of time, the mean estimated vehicle speed Vem obtained on the basis of the wheel speeds Ve is used as the true vehicle speed Vt, until the controller 60 is turned off with an ignition switch of the vehicle turned off. In this event, the alarm light 110 is activated to inform the vehicle operator of the abnormality of the ultrasonic vehicle speed sensor 48.

Thus, the present embodiment of the Doppler-effect vehicle ground speed detecting apparatus is arranged such that the true vehicle speed Vt is obtained by adjusting the currently calculated mean Doppler speed Vdm by the compensating value ΔV, during a predetermined initial period of abnormality of the output of the ultrasonic vehicle speed sensor 48, and such that the currently obtained estimated vehicle speed Ve is determined as the true vehicle speed Vt and an alarm is provided to inform the vehicle operator of the existence of the abnormality on the detection of the vehicle ground speed, if the abnormality continues even after the initial period has expired. The above arrangement is based on the assumption that the abnormality is considered to be temporary during the initial period, and permanent after the expiration of the initial period.

On the other hand, the mean Doppler speed Vdm currently obtained on the basis of the output of the sensor 48 is used or determined as the true vehicle speed Vt when no abnormality of the output of the sensor 48 is considered to exist, that is, in one of the following three cases: while the difference between the mean estimated vehicle speed Vem and the mean Doppler speed Vdm is not larger than the threshold value "A"; before a predetermined time has elapsed after the difference has exceeded the threshold value "A"; and while the voltage level v of the output signal of the receiver 54 is not lower than the threshold value vlo, even after the predetermined time has elapsed.

Possible causes for the abnormality of the output of the ultrasonic vehicle speed sensor 48 include failure or defects of the sensor 48 per se (which may result from chronological changes of electric elements used therein), adverse wave reflecting condition of the ground surface (road surface), and foreign matters deposited on the members of the sensor 48 through which the ultrasonic wave propagates.

Referring now to the flow chart of FIG. 5, the routine for determining the vehicle ground speed in the form of the true vehicle speed Vt will be described in detail.

This routine is started with step S41 to determine whether the absolute value of a difference between the current mean estimated vehicle speed Vem (calculated in step S4 of the routine of FIG. 3) and the current mean estimated Doppler speed Vdm (calculated in step S2 of FIG. 3) is larger than the predetermined threshold value "A" or not. If an affirmative decision (YES) is obtained in step S41, step S42 is implemented to increment the count "C" of a second counter 107 of the RAM 74. If a negative decision (NO) is obtained in step S41, step S43 is implemented to reset the count "C" to "0". This counter 107 is reset to "0" when the controller 60 is turned on.

Steps S42 and S43 are followed by step S44 to determine whether the count "C" of the second counter 107 is larger than a predetermined threshold value "Cmax" or not. If a negative decision (NO) is obtained in step S44, the control flow goes to step S45 in which the current mean Doppler speed Vdm is determined as the true vehicle speed Vt. Thus, the ground speed of the vehicle (Vt) is determined solely by the output of the ultrasonic vehicle speed sensor 48.

If the absolute difference between the mean estimated vehicle speed Vem and the mean Doppler speed Vdm is larger than the threshold value "A" for more than a predetermined length of time, an affirmative decision (YES) is obtained in step S44 with the count "C" exceeding the threshold value "Cmax", whereby the control flow goes to step S46 and the following steps. In step S46, the count "CC" of a third counter 108 is initialized to "1". Step S46 is followed by step S47 to monitor the voltage level v of the output signal of the receiver 54 for a predetermined time length, for example, 50 msec. The voltage of the output signal changes at a frequency which varies with a change in the receiving frequency fr. A maximum voltage level vmax during that time length is determined, and stored in the MAXIMUM VOLTAGE memory 109. This memory 109 is adapted to store the last 10 maximum voltage values vmax. Step S47 is followed by step S48 to calculate a mean maximum voltage vm, that is, an average of the last 10 maximum voltage values vmax stored in the MAXIMUM VOLTAGE memory 109a of the RAM 74. The mean maximum voltage vm is stored in the MEAN MAXIMUM VOLTAGE memory 109b.

Then, the control flow goes to step S49 to determine whether the mean maximum voltage vm is lower than the predetermined threshold value vlo or not. This threshold value vlo is determined such that the maximum voltage level of the output signal of the receiver 54 will not drop below that threshold value vlo as long as the ultrasonic vehicle speed sensor 48 is normal. For example, the threshold value vlo is determined to be close to the nominal mean minimum level of the voltage v. If the mean maximum voltage vm is not lower than the threshold value vlo, this is interpreted to mean that the ground speed as detected by the ultrasonic vehicle sensor 48 is not abnormal or erroneous, and step S45 is implemented to determine the obtained mean Doppler speed Vdm as the true vehicle speed Vt.

If the mean maximum voltage vm is lower than the threshold value vlo, an affirmative decision (YES) is obtained in step S49, whereby step S50 is implemented to determine whether the count "CC" of the third counter 108 is larger than a predetermined threshold value "CCmax" or not. An affirmative decision (YES) in step S50 means that the mean maximum voltage vm is lower than the threshold value vlo for more than a certain time length corresponding to the threshold value "CCmax". If a negative decision (NO) is obtained in step S50, step S51 is implemented to compensate the mean Doppler speed Vdm for the detecting error, namely, calculate the true vehicle speed Vt by adding the compensating value ΔV to the mean Doppler speed Vdm. Step S51 is followed by step S52 to increment the count "CC" of the third counter 108. The control then returns to step S47.

Steps S47–S52 are repeatedly executed until the count "CC" exceeds the threshold value "CCmax", or until the mean maximum voltage vm rises above the threshold vlo (before the count "CC" exceeds the threshold value "CCmax". If the count "CC" of the third counter 108 becomes larger than the threshold value "CCmax", this indicates that the mean maximum voltage vm has been lower than the threshold value vlo for more than the predetermined period corresponding to the threshold value "CCmax". In this case, the ultrasonic vehicle speed sensor 48 per se is considered to have some abnormality or defect of a permanent nature, and therefore step S50 is followed by step S53 to determine the current mean estimated vehicle speed Vem as the true vehicle speed Vt. In this event, step S54 is then implemented to activate the alarm light 110, thereby informing the vehicle operator that there arises some abnormality in connection with the output of the sensor 48. Steps S53 and S54 are repeatedly executed until the ignition switch of the vehicle is turned off.

If the mean maximum voltage vm once lowered below the threshold value vlo rises above this threshold value before the count "CC" exceeds the threshold value "CCmax", a negative decision (NO) is obtained in step S49, whereby step S45 is implemented to use the obtained mean Doppler speed Vdm as the true vehicle speed Vt, on the assumption that the abnormality is considered to be temporary.

According to the present embodiment, therefore, the output of the ultrasonic vehicle speed sensor 48 is not judged to be abnormal when the estimated vehicle speed Ve is abnormal or erroneous as long as the detected Doppler speed Vd is normal, namely, as long as the voltage level v of the output signal of the receiver 54 is not lower than the threshold value vlo, even if the difference between the speeds Ve and Vd is larger than the threshold value "A". Thus, the present embodiment is adapted to determine the abnormality of the output of the sensor 48 on the basis of not only the difference between Ve and Vd, but also the output voltage of the receiver 54 of the sensor 48, whereby the accuracy of determination of the abnormality is significantly improved.

It will be understood from the foregoing description of the present embodiment that portions of the controller 60 assigned to implement steps S3 and S4 of FIG. 3 constitute vehicle speed estimating means for estimating the vehicle speed, while portions of the controller 60 assigned to implement steps S1 and S2 of FIG. 3 constitute output means for producing an output indicative of the ground speed of the vehicle on the basis of the transmitting and receiving frequencies ft, fr. It will also be understood that portions of the controller 60 assigned to implement steps S41–S44, S46–S50, S52 and S54 of FIG. 5 constitute abnormality judging means for determining the presence and absence of abnormality relating to the output of the sensor 48.

It will also be understood that portions of the controller 60 assigned to implement steps S11–S21 of FIG. 4 and steps S45, S51 and S53 of FIG. 5 constitute vehicle speed determining means for determining the true vehicle speed Vt, according to a result of determination by the abnormality judging means. More specifically, the vehicle speed determining means includes: means for obtaining as the detecting error of the sensor 48 a difference between the estimated vehicle speed and the Doppler speed while the vehicle is running in a condition in which the estimated vehicle speed obtained by the vehicle speed estimating means should substantially coincide with the actual ground speed of the vehicle; means for determining the Doppler speed as the true vehicle speed when the abnormality judging means determines the absence of abnormality of the sensor output; means for obtaining the true vehicle speed by adjusting the Doppler speed by the obtained detecting error of the sensor 48, when the abnormality judging means determines that abnormality of a temporary nature is present on the sensor output is present temporarily; and means for determining the estimated vehicle speed as the true vehicle speed when the abnormality judging means determines that abnormality of a permanent nature is present on the sensor output.

While the first embodiment of the present invention has been described in detail by reference to FIGS. 1–5, it is to be understood that the invention is not limited to the details of the first embodiment wherein the true vehicle speed Vt is obtained by adjusting the Doppler speed Vd by the compensating value ΔV equal to the detecting error of the sensor 48, when the affirmative decision (YES) and the negative decision (NO) are obtained in steps S49 and S50, respectively, and wherein the estimated vehicle speed Ve is used as the true vehicle speed Vt when the affirmative decision (YES) is obtained in step S50, that is, when a predetermined length of time has passed after the mean maximum voltage v of the receiver 54 has exceeded the threshold value vlo. However, steps S50–S52 to obtain the true vehicle speed Vt on the basis of the Doppler speed Vdm and the detecting error are not essential to practice the principle of this invention. For example, the present invention may be modified as illustrated in the flow chart of FIG. 6, which shows a second embodiment of the invention. It will be understood that steps S101–S104 correspond to steps S41, S49, S53 and S45 of the flow chart of FIG. 5. It is noted that the second embodiment does not require the routine of FIG. 4.

In the illustrated embodiments, the abnormality judging means determines the presence of abnormality of the output of the sensor 48 when the difference between the speeds Ve and Vd is larger than the threshold value and when the output level of the receiver 54 is lower than the threshold value, and determines the absence of abnormality of the sensor output in the other cases. However, the present invention may be embodied such that the abnormality judging means determines the absence of abnormality of the sensor output only in the case where the speed difference is smaller than a threshold value while the output level of the receiver 54 is higher than a threshold value, and determines the presence of abnormality of the sensor output in the other cases.

The illustrated embodiments are adapted to determine the presence of abnormality of the sensor output, based on the recognition that there is a high possibility of abnormality or defect of the sensor output when the output level of the receiver 54 is excessively low. However, there may be some causes for the sensor output abnormality, which result in an excessive increase in the output level of the receiver 54. In the light of a possibility of this situation, step S49 of FIG. 5 and S102 of FIG.

6 may be modified to determine whether the output level v (more precisely, mean maximum voltage vm) of the receiver 54 is held within a predetermined range defined by upper and lower limits, or not. In this instance, steps S53 or S103 is implemented if the output level is outside the predetermined range.

Although the alarm light 110 is activated only when the affirmative decision (YES) is obtained in step S50 in the first embodiment, the alarm light 110 may be activated also when the negative decision (NO) is obtained in step S50. In this case, a step to activate the light 110 is provided following step S52, for example.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A Doppler-effect speed detecting apparatus for detecting a ground speed of a motor vehicle, comprising:

vehicle speed estimating means for obtaining an estimated vehicle speed on the basis of rotating speeds of wheels of the vehicle;

a transmitter for transmitting a wave towards a ground surface;

a receiver for receiving a portion of the transmitted wave which is reflected by said ground surface and for producing a receiver output signal having a level;

output means for producing an output indicative of the ground speed of the vehicle, according to a Doppler effect on the basis of a frequency of said transmitted wave and a frequency of the reflected wave; and abnormality judging means for determining presence and absence of abnormality in said output of the output means, on the basis of the level of said receiver output signal as well as a speed difference between said ground speed obtained by said output means and said estimated vehicle speed obtained by said vehicle speed estimating means.

2. A Doppler-effect speed detecting apparatus according to claim 1, wherein said abnormality judging means determines the presence of any abnormality relating to the output of said output means if said speed difference is larger than a predetermined first threshold value and if a difference between said level of said receiver output signal and a nominal receiver output signal level is larger than a predetermined second threshold value.

3. A Doppler-effect speed detecting apparatus according to claim 1, wherein said abnormality judging means determines the absence of any abnormality relating to the output of said output means if said speed difference is smaller than a predetermined first threshold value and if a difference between said level of said receiver output signal and a nominal receiver output signal level is smaller than a predetermined second threshold value.

4. A Doppler-effect speed detecting apparatus according to claim 1, further comprising vehicle speed determining means for determining a provisional vehicle speed on the basis of said output of said output means, and obtaining a correlation between said provisional vehicle speed and said estimated vehicle speed when the vehicle is running under a condition in which an actual ground speed of the vehicle should substantially coincide with said estimated vehicle speed, said vehicle speed determining means determining said provisional vehicle speed as a true vehicle speed during a first time period during which said abnormality judging means determines the absence of any abnormality in the output of said output means, said vehicle speed determining means operating, during a second time period during which said abnormality judging means determines the presence of any abnormality in the output of said output means, to obtain said true vehicle speed by adjusting said provisional vehicle speed according to said correlation obtained under said condition during a third time period which precedes said second time period.

5. A Doppler-effect speed detecting apparatus according to claim 4, wherein said condition is a condition in which the vehicle is running substantially straight with an amount of slip of said wheels being less than a predetermined limit.

6. A Doppler-effect speed detecting apparatus according to claim 4, wherein said correlation is a difference between said provisional vehicle speed and said estimated vehicle speed.

7. A Doppler-effect speed detecting apparatus according to claim 1, further comprising vehicle speed determining means for determining a provisional vehicle speed on the basis of said output of said output means, and obtaining a correlation between said provisional vehicle speed and said estimated vehicle speed when the vehicle is running under a condition in which an actual ground speed of the vehicle should substantially coincides with said estimated vehicle speed, said vehicle speed determining means determining said provisional vehicle speed as a true vehicle speed during a first time period during which said abnormality judging means determines the absence of any abnormality in the output of said output means, said vehicle speed determining means operating, during an initial portion of a second time period during which said abnormality judging means determines the presence of any abnormality in the output of said output means, to obtain said true vehicle speed by adjusting said provisional vehicle speed according to said correlation obtained under said condition during a third time period which precedes said second time period, said vehicle speed determining means operating, during a remaining portion of said second time period, to determine said estimated vehicle speed as said true vehicle speed.

8. A Doppler-effect speed detecting apparatus according to claim 1, further comprising vehicle speed determining means for determining a provisional vehicle speed on the basis of said output of said output means, said vehicle speed determining means determining said provisional vehicle speed as a true vehicle speed during a time period during which said abnormality judging means determines the absence of any abnormality in the output of said output means, said vehicle speed determining means determining said estimated vehicle speed as said true vehicle speed during a time period during which said abnormality judging means determines the presence of any abnormality in the output of said output means.

9. A Doppler-effect speed detecting apparatus for determining a ground speed of a motor vehicle, comprising:

vehicle speed estimating means for obtaining an estimated vehicle speed on the basis of rotating speeds of wheels of the vehicle;
a transmitter for transmitting a wave towards a ground surface;
a receiver for receiving a portion of the transmitted wave which is reflected by said ground surface;
output means for producing an output indicative of the ground speed of the vehicle, according to a Doppler effect on the basis of a frequency of said transmitted wave and a frequency of the reflected waver;
judging means for determining presence and absence of abnormality relating to the output of said output means; and
vehicle speed determining means for determining a provisional vehicle speed on the basis of said output of said output means, and obtaining a correlation between said provisional vehicle speed and said estimated vehicle speed when the vehicle is running under a condition in which an actual ground speed of the vehicle should substantially coincide with said estimated vehicle speed, said vehicle speed determining means determining said provisional vehicle speed as a true vehicle speed during a first time period during which said abnormality judging means determines the absence of any abnormality relating to the output of said output means, said vehicle speed determining means operating, during a second time period during which said abnormality judging means determines the presence of any abnormality relating to the output of said output means, to obtain said true vehicle speed by adjusting said provisional vehicle speed according to said correlation obtained under said condition during a third time period which precedes said second time period.

10. A motor vehicle having a Doppler-effect speed detecting apparatus for detecting a ground speed of the vehicle, said speed detecting apparatus comprising:
vehicle speed estimating means for obtaining an estimated vehicle speed on the basis of rotating speed of wheels of the vehicle;
a transmitter for transmitting a wave towards a ground surface;
a receiver for receiving a portion of the transmitted wave which is reflected by said ground surface and for producing a receiver output signal having a level;
output means for producing an output indicative of the ground speed of the vehicle, according to a Doppler effect on the basis of a frequency of said transmitted wave and a frequency of the reflected wave; and
abnormality judging means for determining presence and absence of abnormality in said output of the output means, on the basis of the level of said receiver output signal as well as a speed difference between said ground speed obtained by said output means and said estimated vehicle speed obtained by said vehicle speed estimating means.

11. A Doppler-effect speed detecting apparatus according to claim 1, wherein said receiver output signal is a voltage signal.

12. A motor vehicle according to claim 10, wherein said receiver output signal is a voltage signal.

13. A method of detecting a ground speed of a motor vehicle, comprising the steps of:
estimating vehicle speed on the basis of rotating speeds of wheels of the vehicle;
transmitting a wave from the vehicle towards a ground surface;
receiving a portion of the transmitted wave which is reflected by said ground surface;
producing an output signal having a level, based on the receiving step;
producing an output indicative of the ground speed of the vehicle, according to a Doppler effect on the basis of a frequency of said transmitted .wave and a frequency of the reflected wave; and
determining presence and absence of abnormality in said output indicative of the ground speed of the vehicle, on the basis of a level of said output signal as well as a speed difference between said ground speed and said estimated vehicle speed.

14. A Doppler-effect speed detecting apparatus for detecting a ground speed of a motor vehicle, comprising:
vehicle speed estimating means for obtaining an estimated vehicle speed on the basis of rotating speeds of wheels of the vehicle;
a transmitter for transmitting a wave towards a ground surface;
a receiver for receiving a portion of the transmitted wave which is reflected by said ground surface and for producing a receiver output signal having a level;
output means for producing an output indicative of the ground speed of the vehicle, according to a Doppler effect on the basis of a frequency of said transmitted wave and a frequency of the reflected wave; and
abnormality judging means for determining presence and absence of abnormality in said output of said output means, said abnormality judging means determining the presence of abnormality in said output if a speed difference between said ground speed obtained by said output means and said estimated vehicle speed obtained by said vehicle speed estimating means is larger than a predetermined first threshold value for more than a predetermined length of time, and if a difference between the level of said receiver output signal and a nominal receiver output signal level is larger than a predetermined second threshold value for more than a predetermined length of time.

* * * * *